United States Patent
Huang et al.

(10) Patent No.: US 8,488,352 B1
(45) Date of Patent: Jul. 16, 2013

(54) METHOD FOR VARYING POWER FACTOR

(75) Inventors: Wen-Nan Huang, New Taipei (TW); Shiu-Hui Lee, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 10 days.

(21) Appl. No.: 13/431,210

(22) Filed: Mar. 27, 2012

(51) Int. Cl.
*H02M 7/04* (2006.01)
*G05F 1/70* (2006.01)

(52) U.S. Cl.
USPC ............................................ 363/89; 323/207

(58) Field of Classification Search
USPC .................. 363/44, 74, 84, 89; 323/207, 299
See application file for complete search history.

(56) References Cited

U.S. PATENT DOCUMENTS

| | | | |
|---|---|---|---|
| 6,259,613 B1 * | 7/2001 | Lee et al. | 363/89 |
| 6,448,744 B1 * | 9/2002 | Malik et al. | 323/207 |
| 7,123,494 B2 * | 10/2006 | Turchi | 363/89 |
| 7,400,517 B2 * | 7/2008 | Allinder | 363/21.05 |
| 7,821,801 B2 * | 10/2010 | Janson et al. | 363/126 |
| 7,859,863 B2 * | 12/2010 | Hsia et al. | 363/21.12 |
| 7,863,828 B2 * | 1/2011 | Melanson | 315/247 |
| 8,094,472 B2 * | 1/2012 | Chang et al. | 363/80 |
| 8,164,930 B2 * | 4/2012 | Tan et al. | 363/44 |
| 8,169,799 B2 * | 5/2012 | Takeuchi | 363/21.12 |
| 8,248,825 B2 * | 8/2012 | Decraemer | 363/21.01 |
| 8,395,366 B2 * | 3/2013 | Uno | 323/284 |
| 8,406,020 B2 * | 3/2013 | Chiba | 363/89 |
| 8,441,237 B2 * | 5/2013 | Schmid et al. | 323/223 |

* cited by examiner

*Primary Examiner* — Adolf Berhane
(74) *Attorney, Agent, or Firm* — Chun-Ming Shih; HDLS IPR Services

(57) ABSTRACT

A method for varying power factor is applied to a power factor correction circuit and a rectified voltage. The rectified voltage is transmitted to the power factor correction circuit. The method for varying power factor is to change the conduction pulses of the power factor correction circuit to change the conduction current and the power factor.

10 Claims, 4 Drawing Sheets

METHOD FOR VARYING POWER FACTOR

BACKGROUND OF THE INVENTION

1. Field of the Invention

The present invention relates to a method for varying factor, and especially relates to a method for varying power factor.

2. Description of Prior Art

The power factor of an alternating-current power system is defined as the ratio of the real power flowing to the load over the apparent power in the circuit, and is a number between 0 and 1. The power factor is very important. The power factor could be improved by a power factor correction circuit. Therefore, the power factor correction circuit is very common in power circuits. Generally speaking, the phase of the current will be designed to close to the phase of the voltage, so that the power factor will be higher.

Most of the conventional methods for varying power factor are to modify the hardware designs, and it is inconvenient. Therefore, it is very important to develop a method for varying power factor without modifying the hardware designs. Moreover, the current value multiplied by the voltage value is the consumption power. To vary conduction current is easy as well when the method for varying power factor is easy (without modifying the hardware designs). Therefore, researching to decrease the consumption power is easy.

SUMMARY OF THE INVENTION

In order to solve the above-mentioned problems, an object of the present invention is to provide a method for varying power factor.

In order to achieve the object of the present invention mentioned above, the method for varying power factor of the present invention is applied to an alternating-current voltage apparatus, a bridge rectifier, a power factor correction unit, a switch unit, a control unit, and a rear end circuit. An alternating-current voltage is sent from the alternating-current voltage apparatus to the bridge rectifier. The alternating-current voltage is transformed into a rectified voltage by the bridge rectifier. The rectified voltage is sent from the bridge rectifier to the power factor correction unit. A first primitive conduction pulse is sent from the control unit to the switch unit to control the power factor correction unit to produce a first primitive current having the same phase of a first voltage of the rectified voltage. The first primitive current is sent from the power factor correction unit to the rear end circuit. A second primitive conduction pulse is sent from the control unit to the switch unit to control the power factor correction unit to produce a second primitive current having the same phase of a second voltage of the rectified voltage. The second primitive current is sent from the power factor correction unit to the rear end circuit. The method for varying power factor includes following steps. A first modified conduction pulse is sent from the control unit to the switch unit. The power factor correction unit is controlled by the switch unit to produce a first modified current after the first modified conduction pulse is received by the switch unit. A second modified conduction pulse is sent from the control unit to the switch unit. The power factor correction unit is controlled by the switch unit to produce a second modified current after the second modified conduction pulse is received by the switch unit. Moreover, the value of the first modified current is different from the value of the first primitive current. The value of the second modified current is different from the value of the second primitive current.

The efficiency of the present invention is to vary power factor easily.

DETAILED DESCRIPTION OF THE INVENTION

Figure 1:
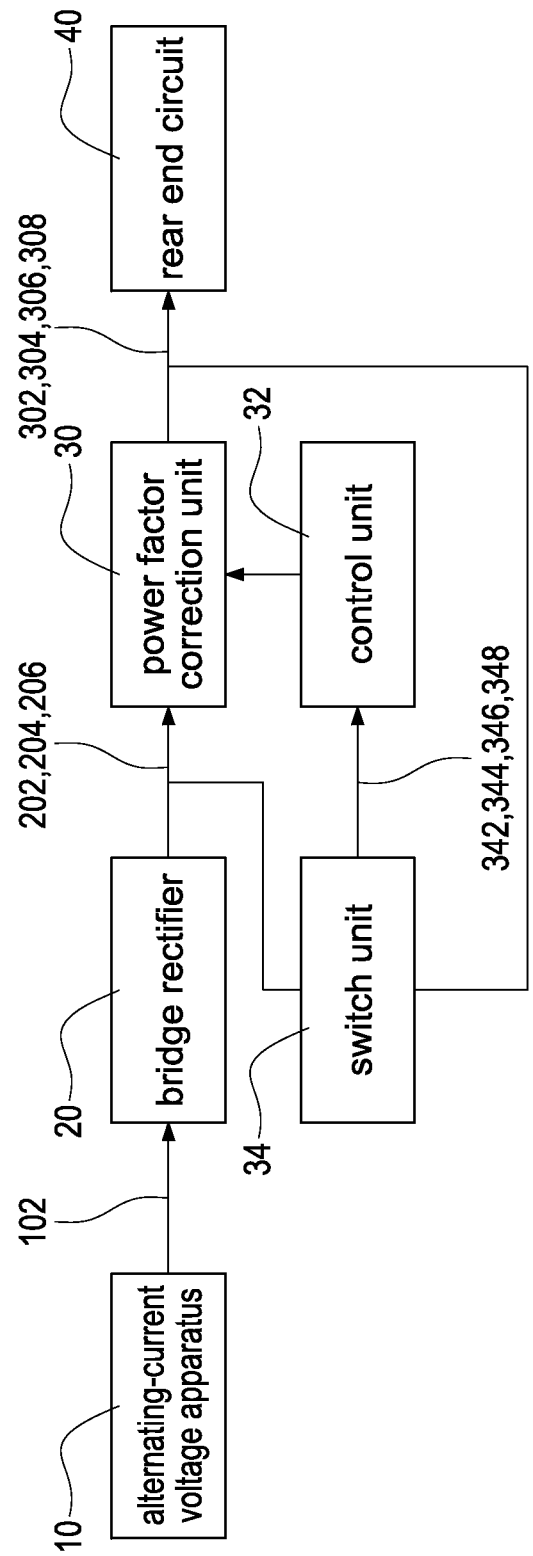
FIG. 1 shows an application block diagram of the method for varying power factor of the present invention.

FIG. 1 shows an application block diagram of the method for varying power factor of the present invention. A control unit 34 is electrically connected to a bridge rectifier 20, a power factor correction unit 30, a switch unit 32, and a rear end circuit 40. The power factor correction unit 30 is electrically connected to the bridge rectifier 20, the switch unit 32, and the rear end circuit 40. An alternating-current voltage apparatus 10 is electrically connected to the bridge rectifier 20.

The method for varying power factor of the present invention is applied to the alternating-current voltage apparatus 10, the bridge rectifier 20, the power factor correction unit 30, the switch unit 32, the control unit 34, and the rear end circuit 40. An alternating-current voltage 102 is sent from the alternating-current voltage apparatus 10 to the bridge rectifier 20. The alternating-current voltage 102 is transformed into a rectified voltage 202 by the bridge rectifier 20. The rectified voltage 202 is sent from the bridge rectifier 20 to the power factor correction unit 30.

Figure 2:
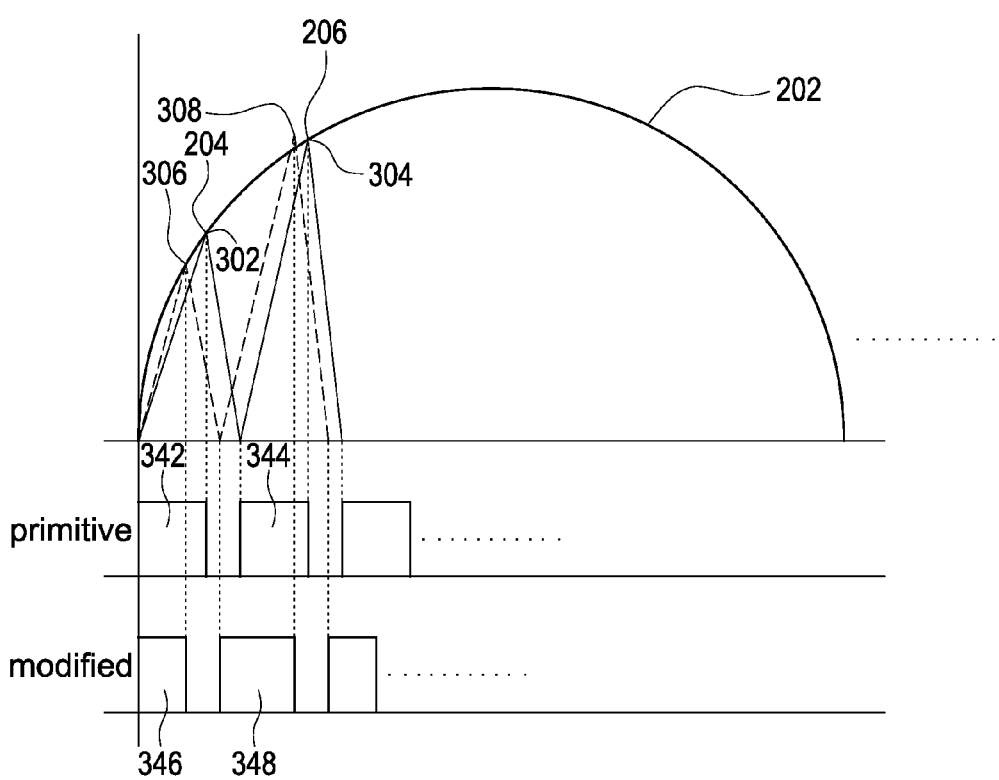
FIG. 2 shows a partial waveform diagram of the method for varying power factor of the present invention.

FIG. 2 shows a partial waveform diagram of the method for varying power factor of the present invention. The waveform shown in the FIG. 2 is exaggerated, idealized and is shown in partial portion in order to describe the present invention more clearly. Please refer to FIG. 1 as well.

Generally speaking, the phase of the current will be designed to be close to the phase of the voltage, so that the power factor will be higher. The phenomenon will be described as following.

A first primitive conduction pulse 342 is sent from the control unit 34 to the switch unit 32 to control the power factor correction unit 30 to produce a first primitive current 302 having the same phase of a first voltage 204 of the rectified voltage 202. The first primitive current 302 is sent from the power factor correction unit 30 to the rear end circuit 40.

A second primitive conduction pulse 344 is sent from the control unit 34 to the switch unit 32 to control the power factor correction unit 30 to produce a second primitive current 304 having the same phase of a second voltage 206 of the rectified voltage 202. The second primitive current 304 is sent from the power factor correction unit 30 to the rear end circuit 40.

However, higher power factor (the phase of the current is closer to the phase of the voltage) is not the purpose of the present invention. For example, both power factor 0.99 and power factor 0.98 are complied with the industry standard, but the consumption power of power factor 0.98 might be less than the consumption power of power factor 0.99. Because the current value multiplied by the voltage value is the consumption power, to decrease the current value will decrease the consumption power when the voltage value is not changed.

Figure 3:
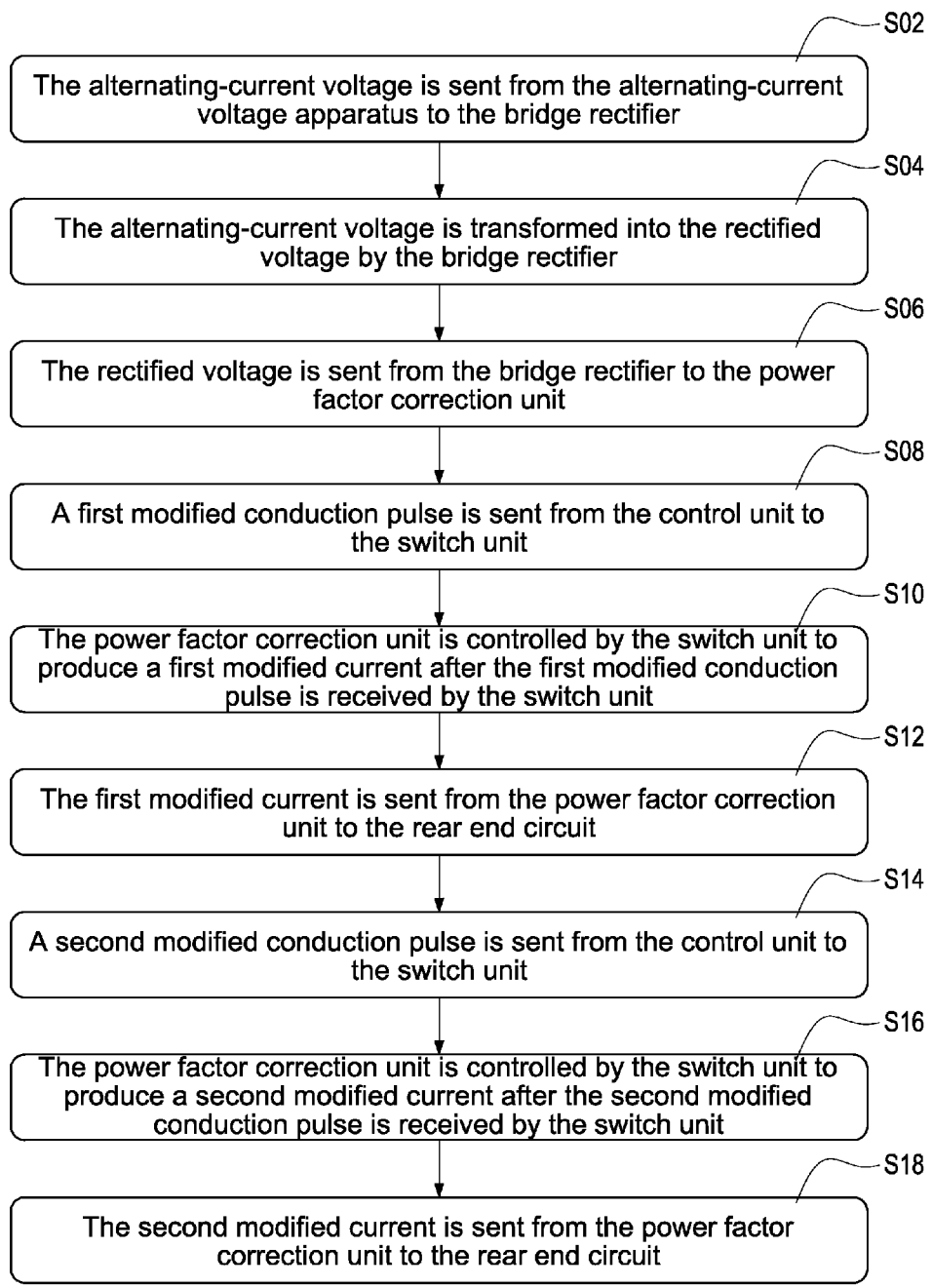
FIG. 3 shows a flow chart of the method for varying power factor of the present invention.

Most of the conventional methods for varying power factor are to modify the hardware designs. The method for varying power factor of the present invention does not modify the hardware designs. This is the purpose of the present invention. Moreover, a further purpose of the present invention is to vary the power factor (vary the current) to decrease the consumption power. FIG. 3 shows a flow chart of the method for varying power factor of the present invention. Please refer to FIG. 1 and FIG. 2 as well. The method for varying power factor of the present invention includes following steps:

S02: The alternating-current voltage 102 is sent from the alternating-current voltage apparatus 10 to the bridge rectifier 20.

S04: The alternating-current voltage 102 is transformed into the rectified voltage 202 by the bridge rectifier 20.

S06: The rectified voltage 202 is sent from the bridge rectifier 20 to the power factor correction unit 30.

S08: A first modified conduction pulse 346 is sent from the control unit 34 to the switch unit 32.

S10: The power factor correction unit 30 is controlled by the switch unit 32 to produce a first modified current 306 after the first modified conduction pulse 346 is received by the switch unit 32.

S12: The first modified current 306 is sent from the power factor correction unit 30 to the rear end circuit 40.

S14: A second modified conduction pulse 348 is sent from the control unit 34 to the switch unit 32.

S16: The power factor correction unit 30 is controlled by the switch unit 32 to produce a second modified current 308 after the second modified conduction pulse 348 is received by the switch unit 32.

S18: The second modified current 308 is sent from the power factor correction unit 30 to the rear end circuit 40.

Moreover, the value of the first modified current 306 is different from the value of the first primitive current 302. The voltage value corresponding to the first modified current 306 is the value of the first voltage 204 (because the voltages are dense, the voltage value corresponding to the first modified current 306 almost equals to the value of the first voltage 204).

The value of the second modified current 308 is different from the value of the second primitive current 304. The voltage value corresponding to the second modified current 308 is the value of the second voltage 206 (because the voltages are dense, the voltage value corresponding to the second modified current 308 almost equals to the value of the second voltage 206).

The current value multiplied by the voltage value is the consumption power. The value of the first modified current 306 multiplied by the value of the first voltage 204 pluses the value of the second modified current 308 multiplied by the value of the second voltage 206 will be less than the value of the first primitive current 302 multiplied by the value of the first voltage 204 pluses the value of the second primitive current 304 multiplied by the value of the second voltage 206. Therefore, the consumption power of the present invention will be less than the conventional consumption power.

Moreover, the value of the second voltage 206 is greater than the value of the first voltage 204. The value of the first voltage 204 is greater than zero. The value of the second modified current 308 is greater than the value of the second primitive current 304. The value of the second primitive current 304 is greater than the value of the first primitive current 302. The value of the first primitive current 302 is greater than the value of the first modified current 306. The value of the first modified current 306 is greater than zero. The value which subtracts the value of the first modified current 306 from the value of the first primitive current 302 is greater than the value which subtracts the value of the second primitive current 304 from the value of the second modified current 308.

Moreover, the conduction time of the second modified conduction pulse 348 is longer than the conduction time of the second primitive conduction pulse 344. The conduction time of the second primitive conduction pulse 344 is equal to the conduction time of the first primitive conduction pulse 342. The conduction time of the first primitive conduction pulse 342 is longer than the conduction time of the first modified conduction pulse 346. The conduction time of the first modified conduction pulse 346 is longer than zero. The conduction time of the first modified conduction pulse 346 pluses the conduction time of the second modified conduction pulse 348 will be shorter than the conduction time of the first primitive conduction pulse 342 pluses the conduction time of the second primitive conduction pulse 344.

Figure 4:
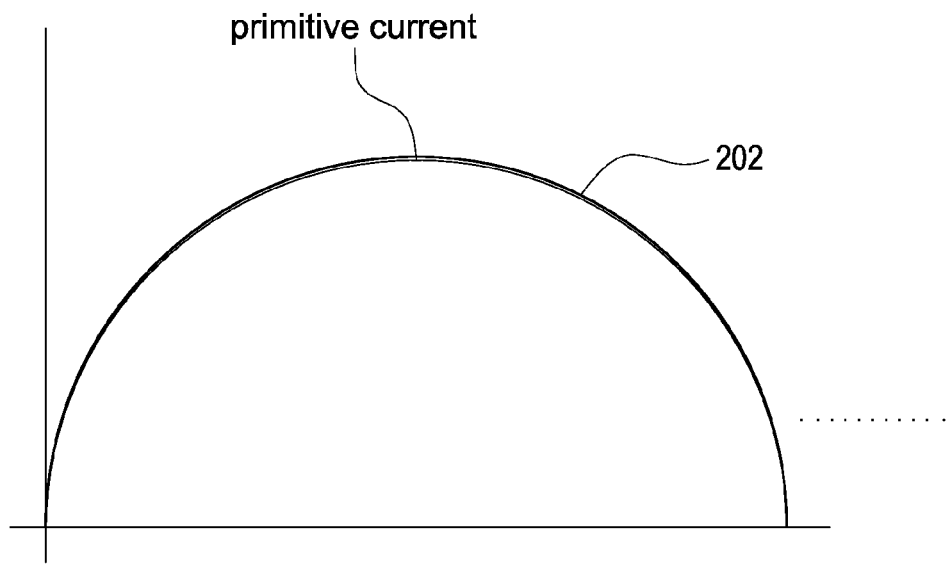
FIG. 4 shows a waveform diagram of the primitive current.
Figure 5:
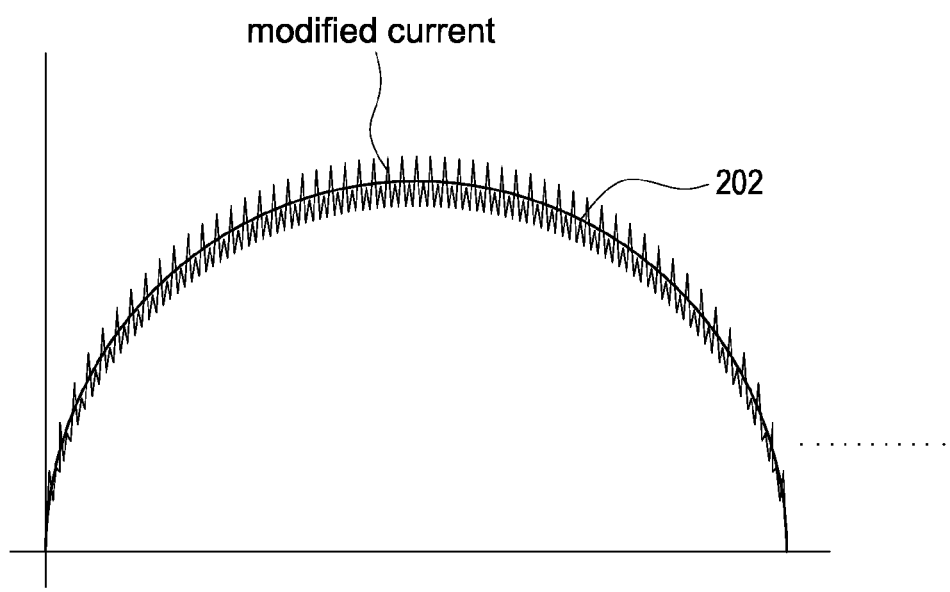
FIG. 5 shows a waveform diagram of the present invention.

Only two pulses are shown in the FIG. 2, but in fact there are a lot of pulses (to result in a lot of currents). In an embodiment, the odd number modified currents of the present invention will be less than the primitive currents. The even number modified currents of the present invention will be greater than the primitive currents. The waveform of the primitive current is closed to the waveform of the rectified voltage 202, so that the power factor is higher (as shown in the FIG. 4). However, the waveform of the modified current of the present invention is saw-toothed around the waveform of the rectified voltage 202 (as shown in the FIG. 5).

The contents of the present invention will be explained with mathematical expressions as followings:

The symbol V1 represents the first voltage 204. The symbol V2 represents the second voltage 206. The symbol I1 represents the first primitive current 302. The symbol I2 represents the second primitive current 304. The symbol $\Delta I1$ represents the value which subtracts the value of the first modified current 306 from the value of the first primitive current 302. The symbol $\Delta I2$ represents the value which subtracts the value of the second primitive current 304 from the value of the second modified current 308. The symbol R represents the resistance. If the consumption power of the present invention is less than the conventional consumption power, there are mathematical expressions as followings:

$$V1 \cdot (I1 - \Delta I1) + V2 \cdot (I2 + \Delta I2) < V1 \cdot I1 + V2 \cdot I2$$

$$V1 \cdot I1 - V1 \cdot \Delta I1 + V2 \cdot I2 + V2 \cdot \Delta I2 < V1 \cdot I1 + V2 \cdot I2$$

$$-V1 \cdot \Delta I1 + V2 \cdot \Delta I2 < 0$$

$$V2 \cdot \Delta I2 < V1 \cdot \Delta I1$$

$$\Delta I2 < K \cdot \Delta I1 \text{ (wherein } K = V1/V2\text{)}$$

Moreover, the resistance value multiplied by the square of the current value is the consumption power as well. Therefore:

$$(I1 - \Delta I1)^2 \cdot R + (I2 + \Delta I2)^2 \cdot R < I1^2 \cdot R + I2^2 \cdot R$$

$$(I1 - \Delta I1)^2 + (I2 + \Delta I2)^2 < I1^2 + I2^2$$

$$I1^2 - 2 \cdot I1 \cdot \Delta I1 + \Delta I1^2 + I2^2 + 2 \cdot I2 \cdot \Delta I2 + \Delta I2^2 < I1^2 + I2^2$$

$$-2 \cdot I1 \cdot \Delta I1 + \Delta I1^2 + 2 \cdot I2 \cdot \Delta I2 + \Delta I2^2 < 0$$

$$-2 \cdot I1 \cdot \Delta I1 + \Delta I1^2 + 2 \cdot I2 \cdot K \cdot \Delta I1 + K^2 \cdot \Delta I1^2 < 0$$

$$\Delta I1 \cdot [-2 \cdot I1 + \Delta I1 + 2 \cdot I2 \cdot K + K^2 \cdot \Delta I1] < 0$$

$$-2 \cdot I1 + 2 \cdot I2 \cdot K + \Delta I1 \cdot (1 + K^2) - 0$$

$$-2\cdot(I1-I2\cdot K)+\Delta I1\cdot(1+K^2)<0$$

$$\Delta I1\cdot(1+K^2)<2\cdot(I1-I2\cdot K)$$

$$\Delta I1<[2\cdot(I1-I2\cdot K)]/(1+K^2)$$

The contents mentioned above are for the left half period of the rectified voltage 202. The contents of the right half period of the rectified voltage 202 are similar to the contents of the left half period of the rectified voltage 202. Therefore, the contents of the right half period of the rectified voltage 202 are omitted.

The method for varying power factor of the present invention is to change the conduction pulses of the power factor correction circuit to change the conduction current and the power factor. Moreover, the consumption power of the present invention will be less than the conventional consumption power (according to the design for the satisfaction of the mathematical expressions mentioned above).

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for varying power factor applied to an alternating-current voltage apparatus, a bridge rectifier, a power factor correction unit, a switch unit, a control unit, and a rear end circuit; an alternating-current voltage being sent from the alternating-current voltage apparatus to the bridge rectifier; the alternating-current voltage being transformed into a rectified voltage by the bridge rectifier; the rectified voltage being sent from the bridge rectifier to the power factor correction unit; a first primitive conduction pulse being sent from the control unit to the switch unit to control the power factor correction unit to produce a first primitive current having the same phase of a first voltage of the rectified voltage; the first primitive current being sent from the power factor correction unit to the rear end circuit; a second primitive conduction pulse being sent from the control unit to the switch unit to control the power factor correction unit to produce a second primitive current having the same phase of a second voltage of the rectified voltage; the second primitive current being sent from the power factor correction unit to the rear end circuit;

the method for varying power factor including:
 a. the control unit sending a first modified conduction pulse to the switch unit;
 b. the switch unit controlling the power factor correction unit to produce a first modified current after the first modified conduction pulse is received by the switch unit;
 c. the control unit sending a second modified conduction pulse to the switch unit; and
 d. the switch unit controlling the power factor correction unit to produce a second modified current after the second modified conduction pulse is received by the switch unit, wherein the value of the first modified current is different from the value of the first primitive current; the value of the second modified current is different from the value of the second primitive current.

2. The method for varying power factor in claim 1, wherein the voltage value corresponding to the first modified current is the value of the first voltage; the voltage value corresponding to the second modified current is the value of the second voltage; the value of the first modified current multiplied by the value of the first voltage pluses the value of the second modified current multiplied by the value of the second voltage is less than the value of the first primitive current multiplied by the value of the first voltage pluses the value of the second primitive current multiplied by the value of the second voltage.

3. The method for varying power factor in claim 2, wherein the value of the second voltage is greater than the value of the first voltage; the value of the first voltage is greater than zero.

4. The method for varying power factor in claim 3, wherein the value of the second modified current is greater than the value of the second primitive current; the value of the second primitive current is greater than the value of the first primitive current; the value of the first primitive current is greater than the value of the first modified current; the value of the first modified current is greater than zero.

5. The method for varying power factor in claim 4, wherein the value which subtracts the value of the first modified current from the value of the first primitive current is greater than the value which subtracts the value of the second primitive current from the value of the second modified current.

6. The method for varying power factor in claim 5, wherein the conduction time of the second modified conduction pulse is longer than the conduction time of the second primitive conduction pulse; the conduction time of the second primitive conduction pulse is equal to the conduction time of the first primitive conduction pulse.

7. The method for varying power factor in claim 6, wherein the conduction time of the first primitive conduction pulse is longer than the conduction time of the first modified conduction pulse; the conduction time of the first modified conduction pulse is longer than zero.

8. The method for varying power factor in claim 7, wherein the conduction time of the first modified conduction pulse pluses the conduction time of the second modified conduction pulse is shorter than the conduction time of the first primitive conduction pulse pluses the conduction time of the second primitive conduction pulse.

9. The method for varying power factor in claim 8, wherein in the plural modified currents produced by the power factor correction unit, the odd number modified currents are less than the primitive currents, and the even number modified currents are greater than the primitive currents; the waveform of the modified current is saw-toothed around the waveform of the rectified voltage.

10. The method for varying power factor in claim 9,
after the step b and before the step c further including:
 b1. the power factor correction unit sending the first modified current to the rear end circuit,
after the step d further including:
 d1. the power factor correction unit sending the second modified current to the rear end circuit.

* * * * *